US012165468B2

(12) United States Patent
Daranyi et al.

(10) Patent No.: US 12,165,468 B2
(45) **Date of Patent: *Dec. 10, 2024**

(54) GAMING MACHINES HAVING RETROFITTABLE INSERTABLE MEMORY EXPANSION BOARD WITH ONBOARD RANDOM NUMBER GENERATOR

(71) Applicant: Aristocrat Technologies Australia Pty Limited, North Ryde (AU)

(72) Inventors: Sandor Daranyi, Wahroonga (AU); Shane Perrow, Kembla Heights (AU); Tyson Adams, Henderson, NV (US); Rodney Slade, Henderson, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,439

(22) Filed: Aug. 4, 2023

(65) Prior Publication Data

US 2023/0410594 A1 Dec. 21, 2023

Related U.S. Application Data

(63) Continuation of application No. 17/751,606, filed on May 23, 2022, now Pat. No. 11,756,378, which is a (Continued)

(30) Foreign Application Priority Data

Jun. 26, 2019 (AU) ................................ 2019902239
Jul. 31, 2019 (AU) ................................ 2019210586

(51) Int. Cl.
*G07F 17/32* (2006.01)

(52) U.S. Cl.
CPC ................................ *G07F 17/3227* (2013.01)

(58) Field of Classification Search
CPC ............. G07F 17/3227; G07F 17/3218; G07F 17/3223; G07F 17/3241
See application file for complete search history.

(56) References Cited

U.S. PATENT DOCUMENTS 4,415,153 A 11/1983 Yokoi
4,527,798 A 7/1985 Siekierski (Continued)

OTHER PUBLICATIONS

Joshua Liebow-Feeser, Randomness 101: LavaRand in Production, Nov. 6, 2017, https://blog.cloudflare.com/randomness-101-lavarand-in-production (Year: 2017).*

(Continued)

*Primary Examiner* — Kevin Y Kim
(74) *Attorney, Agent, or Firm* — McAndrews, Held & Malloy, Ltd.

(57) ABSTRACT

A gaming device comprises a main board comprising a processor, a memory storing system program code and an expansion port in data communication with a memory interface of the processor, and a memory expansion board connected to the main board via the expansion port. The memory expansion board comprises a device configured to execute a random number generator and write random numbers into one or more registers of the memory expansion board accessible by the main board, and at least one connector for connecting a memory module comprising game program code. When the processor requires random numbers, the system program code causes the processor to read random numbers from the one or more registers of the memory expansion board.

20 Claims, 5 Drawing Sheets

Related U.S. Application Data continuation of application No. 16/856,983, filed on Apr. 23, 2020, now Pat. No. 11,341,809.

(56) References Cited

U.S. PATENT DOCUMENTS

| | | | |
|---|---|---|---|
| 5,627,775 | A | 5/1997 | Hong |
| 5,970,069 | A | 10/1999 | Kumar |
| 6,253,223 | B1 | 6/2001 | Sprunk |
| 6,704,871 | B1 | 3/2004 | Kaplan |
| 2004/0030734 | A1 | 2/2004 | Wells |
| 2005/0054445 | A1 | 3/2005 | Gatto |
| 2006/0008083 | A1 | 1/2006 | Saito |
| 2009/0036188 | A1 | 2/2009 | Gelman |

OTHER PUBLICATIONS

Article on randomness (Year: 2017).*
Office Action (Non-Final Rejection) dated Jul. 26, 2021 for U.S. Appl. No. 16/856,983 (pp. 1-12).
Office Action (Final Rejection) dated Nov. 5, 2021 for U.S. Appl. No. 16/856,983 (pp. 1-8).
Office Action (Notice of Allowance and Fees Due (PTOL-85) dated Jan. 20, 2022 for U.S. Appl. No. 16/856,983 (pp. 1-8).
Office Action (Non-Final Rejection) dated Mar. 8, 2023 for U.S. Appl. No. 17/751,606 (pp. 1-6).
Office Action (Notice of Allowance and Fees Due (PTOL-85)) dated May 22, 2023 for U.S. Appl. No. 17/751,606 (pp. 1-7).

* cited by examiner

GAMING MACHINES HAVING RETROFITTABLE INSERTABLE MEMORY EXPANSION BOARD WITH ONBOARD RANDOM NUMBER GENERATOR

RELATED APPLICATIONS

The present application is a continuation application of U.S. patent application Ser. No. 17/751,606, filed May 23, 2022, and entitled "Gaming Machines Having Retrofittable Insertable Memory Expansion Board with Onboard Random Number Generator" which is a continuation application of U.S. patent application Ser. No. 16/856,983, filed Apr. 23, 2020, issuing on May 24, 2022 as U.S. Pat. No. 11,341,809, and entitled "Gaming Machines Having Retrofittable Insertable Memory Expansion Board with Onboard Random Number Generator" which claims priority to Australian Patent Application No. 2019210586, filed Jul. 31, 2019, and Australian Patent Application No. 2019902239, filed Jun. 26, 2019, which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments of the disclosure exploit the capability of gaming devices to add games via a memory expansion board in order to incorporate an improved or additional random number generator into the gaming device. Embodiments provide a memory expansion board that incorporates a random number generator device. Software resident on the main board of the gaming device enables the processor read random numbers from the memory expansion board via the processor's memory interface.

In an embodiment, a gaming device comprises a main board comprising a processor, a memory storing system program code and an expansion port in data communication with a memory interface of the processor. A memory expansion board is connected to the main board via the expansion port, the memory expansion board comprises a device configured to execute a random number generator and write random numbers into one or more registers of the memory expansion board accessible by the main board, and at least one connector for connecting a memory module comprising game program code. When the processor requires random numbers, the system program code causes the processor to read random numbers from the one or more registers of the memory expansion board.

In another embodiment, there is provided a memory expansion board for connecting to a main board of a gaming device via an expansion port. The memory expansion board comprises a device configured to execute a random number generator and write random numbers into one or more registers of the memory expansion board accessible by the main board so that a processor of the main board can read random numbers from the one or more registers, and at least one connector for connecting a memory module comprising game program code.

In another embodiment, there is provided a method of retrofitting a gaming device comprising connecting a memory expansion board to an expansion port of a main board of the gaming device, the memory expansion board comprising a device configured to execute a random number generator and write random numbers into one or more registers of the memory expansion board accessible by the main board, and at least one connector for connecting a memory module comprising game program code, and updating system software in a memory of the main board to include instructions which when executed by a processor of the main board cause the processor to read random numbers from the one or more registers of the memory expansion board when the processor requires random numbers.

DETAILED DESCRIPTION

Embodiments of the present disclosure represent an improvement in the art of electronic gaming machines, systems, and software for such electronic gaming machines or systems. For example, at least some embodiments of the present disclosure provide a retrofittable memory expansion board with an onboard random number generator. In such embodiments, the retrofittable memory expansion board may inserted in existing gaming machines via a memory interface. In such embodiments, the retrofittable memory expansion board may provide true random numbers to the electronic gaming machines via the memory interface. In some embodiments, the electronic gaming machines may also generate respective random numbers in concert with the onboard random number generator. In some embodiments, the onboard random number generator may be embedded in a NIO CPU to generate true or pseudo-random numbers. When the gaming machines need random numbers, the gaming machines reads the random numbers generated in the onboard random number generator.

Further, the availability of random numbers also provides uninterrupted player experience such that the player may only need to focus on playing games, without being overly bored with perceived delay or repetitiveness of the games. Thus, embodiments of the present disclosure are not merely new game rules or simply new display patterns, but provide technologic improvements in the art of electronic gaming machines and software for such electronic gaming machines. Moreover, the above example is not intended to be limiting but merely exemplary of technologic improvements provided by some embodiments of the present disclosure. Technological improvements of other embodiments are readily apparent to those of ordinary skill in the art in light of the present disclosure.

Figure 1:
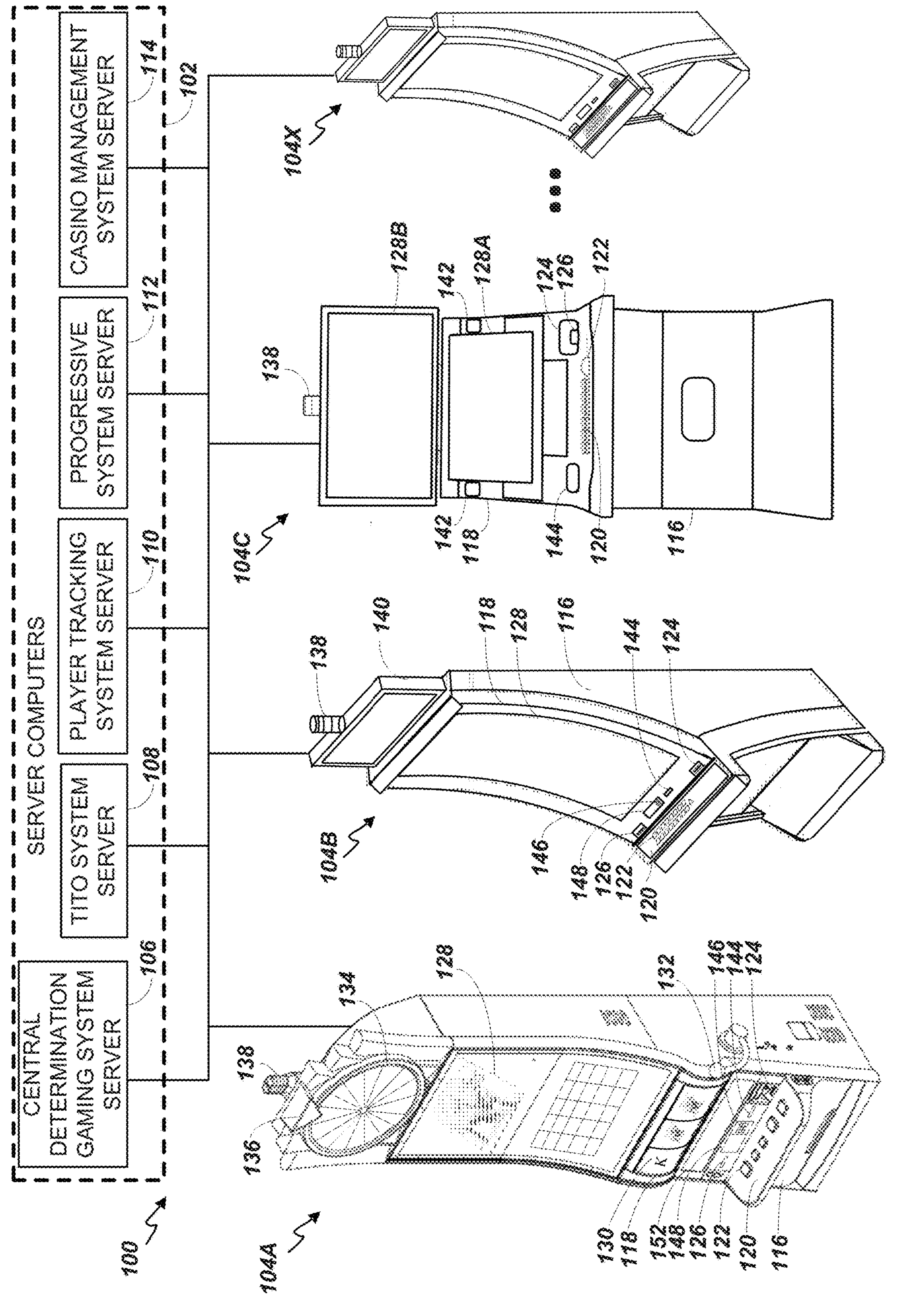
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 119 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a backlit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Many or all the above-described components can be controlled by circuitry housed inside the main cabinet 116 of the gaming device 104A.

Note that not all gaming devices necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 119 which opens to provide access to the interior of the gaming device 104B. The main or service door 119 is typically used by service personnel to refill the ticket-out printer 126 and collect bills and tickets inserted into the bill validator 124. The door 119 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 2:
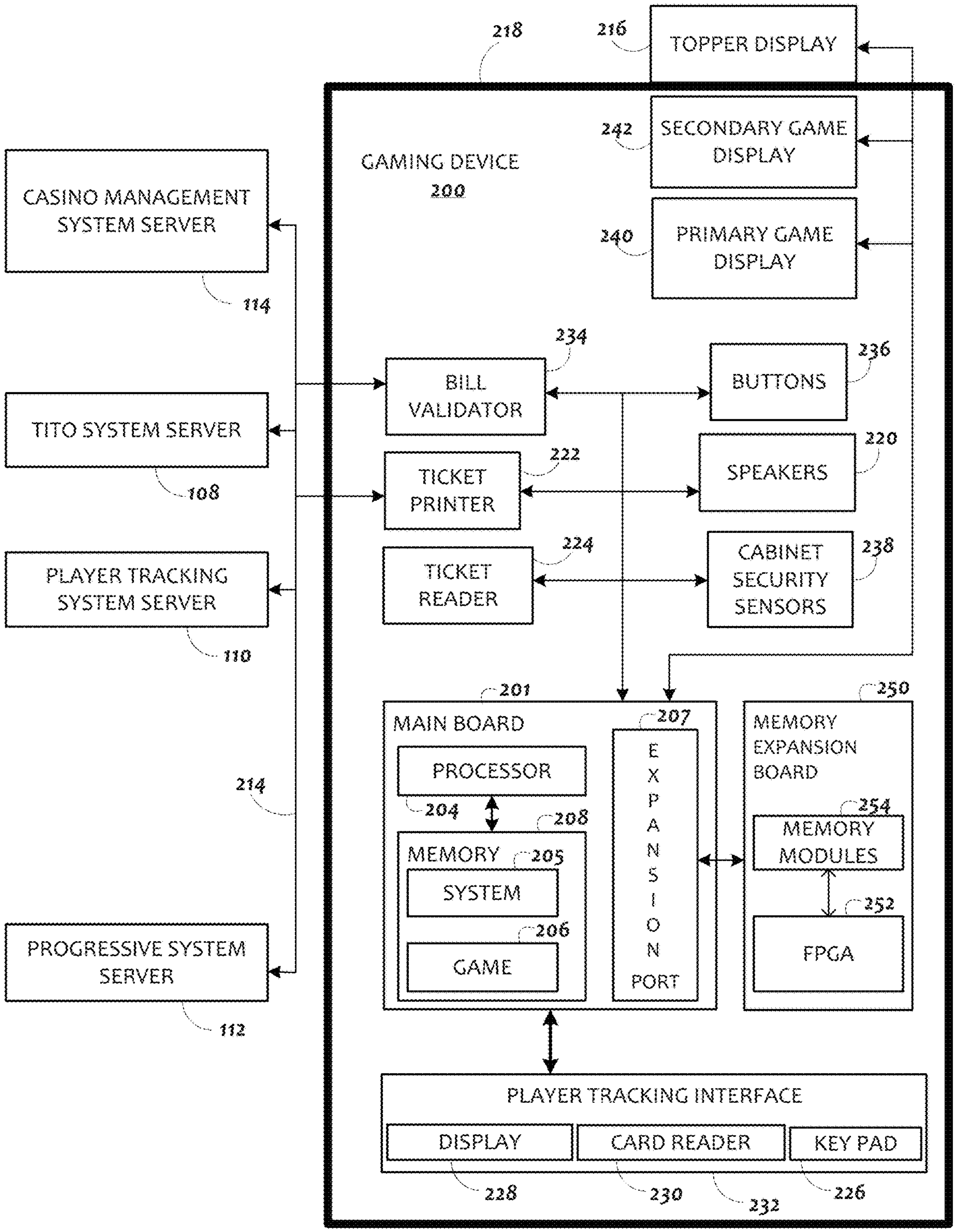
FIG. 2 is a block diagram showing various functional elements of an exemplary EGM.

FIG. 2 is a block diagram depicting exemplary internal electronic components of a gaming machine 200 fitted with a memory expansion board 250 of an embodiment of the disclosure. Gaming machine 200 is shown connected to various external systems. Gaming machine 200 includes one or more processors 204 and a memory 208 coupled to the processor 204.

The memory 208 may include RAM, ROM or another form of storage media that stores instructions for execution by the processor 204. In an example, memory 208 stores system software 205 and game software 206.

The gaming machine 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming machine 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player-tracking interface 232 may include a keypad 226 for entering information, a player tracking display 228 for displaying information (e.g., an illuminated or video display), a card reader 230 for receiving data and/or communicating information to and from media or a device such as a smart phone-enabling player tracking. Ticket printer 222 may be used to print tickets for a TITO system server 108. The gaming machine 200 may further include a bill validator 234, buttons 236 for player input, cabinet security sensors 238 to detect unauthorized opening of the cabinet 218, a primary game display 240, and a secondary game display 242, each coupled to and operable under the control of main board 201.

Gaming machine 200 may be connected over network 214 to player tracking system server 110. Player tracking system server 110 may be, for example, an OASIS ° system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player-tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming machines, such as gaming machines 104A-104X, 200, are highly regulated to ensure fairness and, in many cases, gaming machines 104A-104X, 200 are operable to award monetary awards (e.g., typically dispensed in the form of a redeemable voucher). Therefore, to satisfy security and regulatory requirements in a gaming environment, hardware and software architectures are implemented in gaming machines 104A-104X, 200 that differ significantly from those of general-purpose computers. Adapting general-purpose computers to function as gaming machines 200 is not simple or straightforward because of: 1) the regulatory requirements for gaming machines 200, 2) the harsh environment in which gaming machines 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming machine 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming machine 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming machine 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming machine 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

In an example, gaming machine 200 is formed by retrofitting memory expansion board 250 to gaming machine 200. In an example, gaming machine is an EGM operating on the Aristocrat MK6 platform such as the Aristocrat Xcite EGM.

Memory expansion board 250 is connected to main board 201 via an expansion port 207 of main board 201 that is in data communication with the memory interface of the processor 204. It will be appreciated that main board 201 also includes other components that are not illustrated such as a power supply. In an example, the processor's memory expansion interface has two areas, a first area for addressing memory and a second area for addressing input/output devices and the memory expansion board is accessed via the second area in order to avoid disturbing the memory allocation. In other examples, the memory could be one contiguous block or may be divided up into several sections, by "chip select" control signals or by memory paging. Further, it will be appreciated that the processor has even more separate memory areas (governed by multiple chip select control signals) and it is the memory expansion interface of the processor that has two areas.

Memory expansion board 250 has a programmable logic device in the form of a field programmable gate array (FPGA) and a plurality of connectors 281A-281N (e.g. sockets) for connecting one or more memory modules 254A-254N storing game software to the memory expansion board 250. Memory expansion board 250 allows gaming machine 200 to provide more than one game or a game different to that of game software 206. Memory expansion board 250 also allows gaming machine to provide a game requiring more software than can be accommodated by size of memory 208.

As explained below, in the embodiments, memory expansion board 250 provides a random number generator 259 for use by gaming machine 200 in generating game instances. In one example, the random number generator 259 is used in conjunction with existing game software 206. In another example, random number generator 259 is used in conjunction with game software in one of more of memory modules 254A-254N. In an example, the random number generator 259 enables the main board 201 to have access to a more robust random number generator than originally implemented on the main board 201 while using the same program code. In this example, there may only be a random number generator on memory expansion board. Memory expansion board may also be used to expand system software—i.e. one or more of memory modules 254A-254N may comprise system software.

In this respect, game software (whether in internal memory 208 or loaded from a memory module 254) is configured to request random numbers from system software 205. Accordingly, an aspect of the embodiment to modify system software 205 so that rather than providing the random numbers, system software 205 is configured to communicate with memory expansion board 250 to obtain random numbers. In this respect system, software 205 provides the functions of an operating system, device drivers and generic (rather than game specific) gaming and system functions, including the management of RNG number generation.

Figure 3:
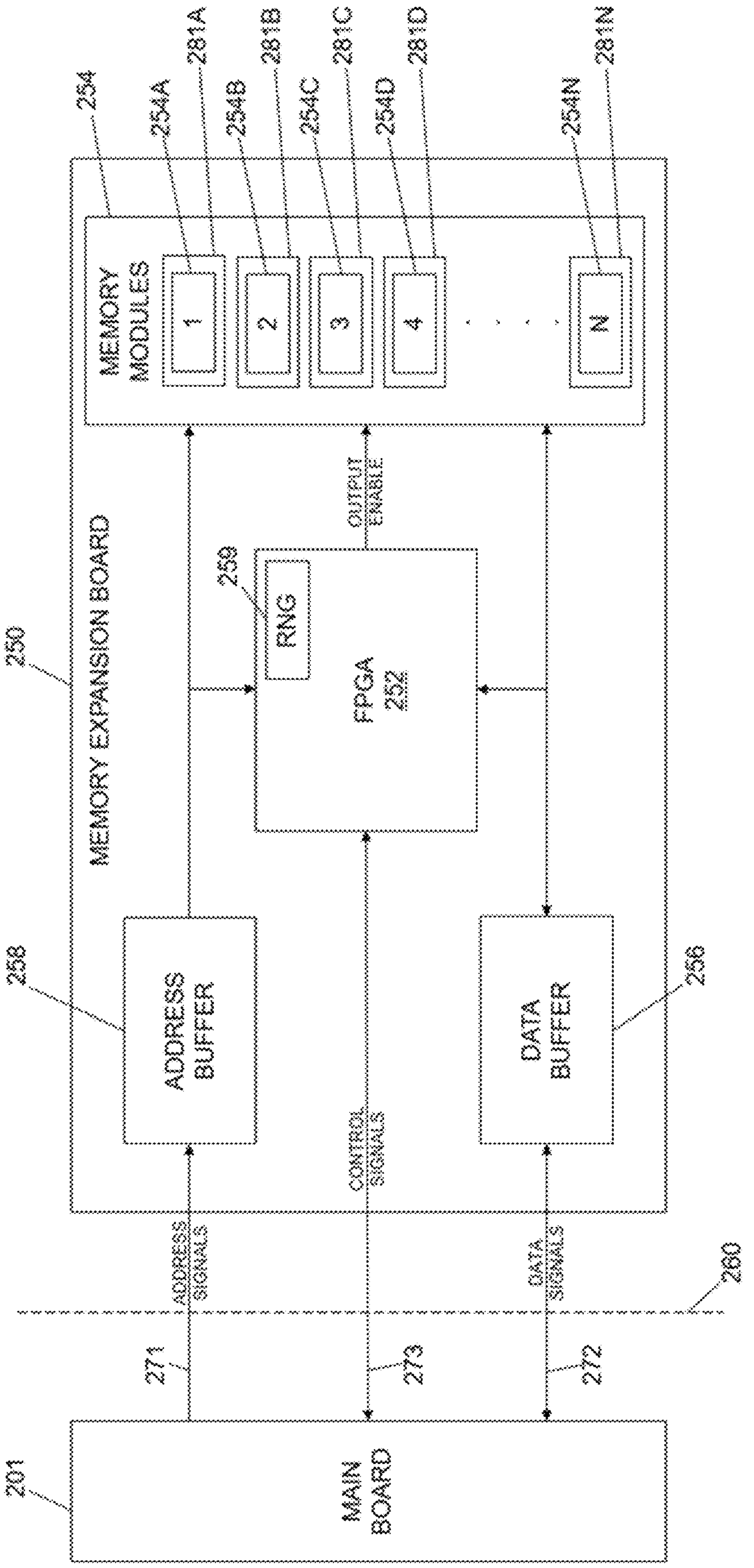
FIG. 3 is a block diagram showing detail of certain components of FIG. 2.

FIG. 3 shows the basic architecture of the memory expansion board 250. There are three basic groups of signals which the main board 201 uses to communicate with the memory expansion board 250:

1. Address bus signals 271.
2. Bidirectional data bus signals 272.
3. Control signals 273.

In an example, the RNG 259 is the BA431 Random Number Generator (RNG) core produced by Silex Inside of Rue du Bosquet, 7, 1348 Louvain-la-Neuve, Belgium. The BA 431 is advantageous as it is capable of outputting true random numbers. However, in other examples, pseudo-random numbers may be acceptable and herein the term random number is used to refer to both true and pseudo-random numbers unless the context expressly indicates otherwise.

In one example, the FPGA is an Altera series FPGA available from Intel Corporation and has a CPU or NIOS CPU. The RNG 259 has an initialization process which is implemented by the CPU or NIOS CPU. During initialization, the memory expansion board 250 will report "Busy" via a designated register. However, the Board ID and Version registers of the memory expansion board 250 may be read by the main board 201 before the RNG core 259 initialization is complete.

Once the RNG core 259 is initialized (and has passed all tests), the keys are then seeded by the CPU or NIOS CPU with values from the RNG 259, and the RNG core 259 is ready to produce random numbers. No initialization of the RNG core 259 is required from the main board 201.

In an example, the memory expansion board 250 requires the main board 201 to complete a system initialization sequence of the main board 201 before the main board 201 becomes fully operational and allows access to the memory modules 254 (in one example memory modules are EPROMs). If the main board 201 attempts to read from EPROM space before initialization is complete, the memory expansion board 250 will forcibly reset the main board 201. Once the initialization is complete, the main board 201 may thereafter request random numbers from the First-In-First-Out (FIFO) buffer.

The RNG core 259 is configured by the NIOS CPU to produce random numbers at a rate in excess of that required by the main board 201, for example, at a nominally 10 Hz. In this mode of operation, random numbers are sampled by the RNG core 259 continuously and fed into a FIFO buffer; once the FIFO buffer is full, sampling is automatically suspended by the RNG core 259 until the FIFO buffer starts to empty again.

The NIOS CPU also has a FIFO buffer which is 128×32-bit values deep and is exposed to the main board 201 bus. It runs in a continuous loop, sampling the BA431 RNG FIFO and the BA431 RNG error status. Each loop iteration will fill the NIOS CPU FIFO with up to 64×32-bit values. Under normal operation, the BA431 RNG FIFO will be full and the NIOS CPU FIFO almost full, which enables short bursts of a large number of RNG requests from main board 201 to be handled.

If the BA431 core reports an error as a result of its continuous tests, the NIOS CPU will apply a soft reset to the RNG core. Under normal operation, it is reasonable to expect that the BA431 RNG core is able to reinitialize before the main board 201 has exhausted the NIOS CPU FIFO of random numbers.

The memory expansion board 250 will report the availability (or not) of random numbers to the main board 201—based solely on the level of the NIOS CPU FIFO buffer—via the system initialization/status register. Hence, the system software running on main board 201 is configured to read the status prior to requesting a pair of 32-bit numbers from the board.

The main board 201 requests a single 32-bit half of a random number by reading either the least or most significant word register of the random number (technically it makes no difference which register is actually read). These registers reside in I/O space on the memory expansion board 250.

The main board 201 read strobe on either register access initiates a NIOS CPU FIFO read and the 32-bit FIFO output is driven onto the main board 201 data bus, where the main board 201 latches it on de-assertion of the read strobe.

In an example, before memory expansion board 250 becomes fully operational, the main board 201 must complete an initialization sequence within 12s of power-on. Failure to complete the sequence will result in the memory expansion board 250 forcibly resetting the main board 201.

In an example, the initialization sequence is as follows:

1) main board 201 reads an expected token from a designated register of the expansion board 250.
2) main board 201 responds by writing a return token to the register.
3) main board 201 reads a random challenge word from the register.
4) main board 201 responds by writing a response derived from the challenge word.
5) main board 201 reads a "Ready" token from the register.

Any other responses from the designated register indicates the main board 201 has not followed the initialization sequence correctly and the sequence must be restarted.

As indicated above, the Board ID and Version registers may be read before commencing the initialization sequence. For example, to confirm that the memory expansion board has a random number generator.

In an example, any deviation from the above, including accessing other on-board registers, will restart the sequence.

In an example, the main board 201 may request a 64-bit random number from the memory expansion board via the following sequence:

1) main board 201 reads a Ready token from the designated register.
2) main board 201 reads the RNG LS Word Register.
3) main board 201 reads the RNG MS Word Register.

If the designated register instead returns a "Busy" token in step 1, then the NIOS CPU FIFO buffer is considered empty (has less than two 32-values) and the main board 201 will re-poll the design register until it returns the Ready token. Under normal operation, this condition is not expected to happen.

Conversely, when the designated register returns a Ready token it is guaranteed that the NIOS CPU FIFO has a minimum of two 32-bit values in it.

Technically, reading either LS or MS word registers has the same effect, i.e. by pulling a 32-bit value from the NIOS CPU FIFO buffer. Therefore, it is not possible, for example, to read the LS word twice and expect the same value. Similarly, reading either register before the other, or either register twice, results in the same sequence of random numbers being read by the main board 201.

In an alternative embodiment, rather than using the FPGA to produce the random numbers, a dedicated hardware random number generator device is incorporated on the memory expansion board.

Figure 4:
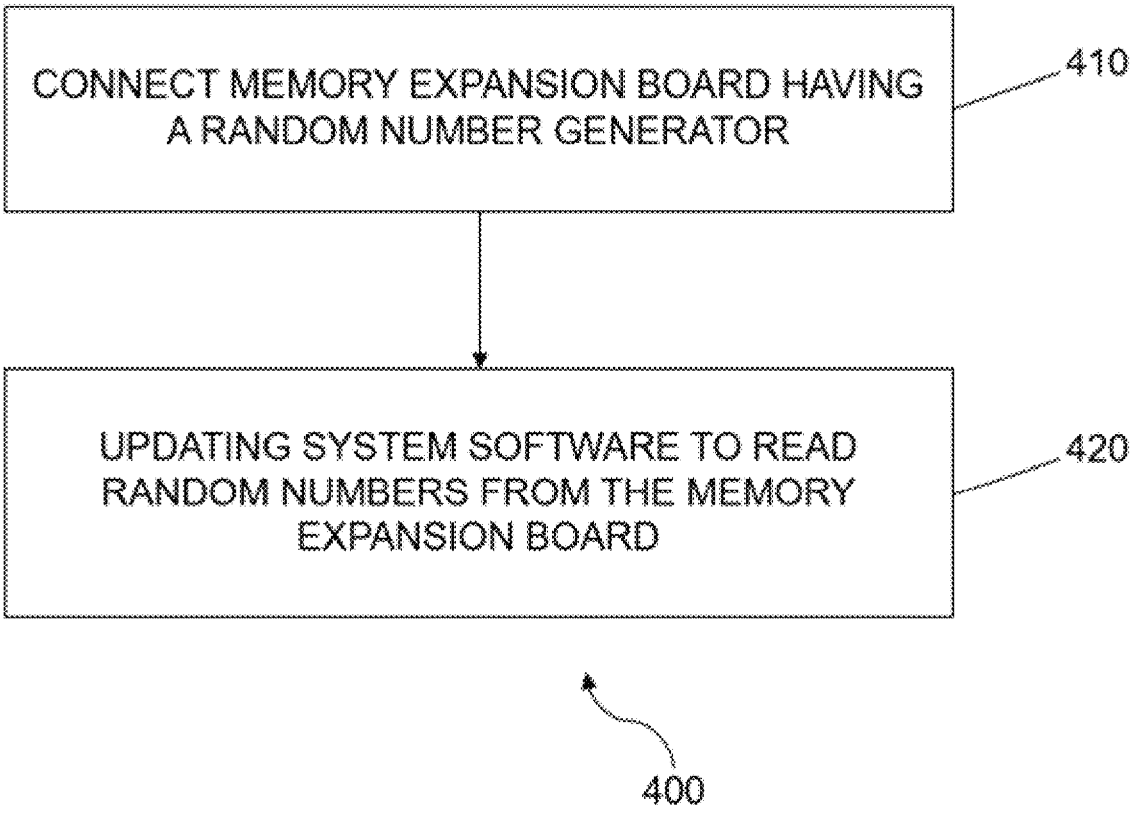
FIG. 4 is a flow chart of a method of retrofitting a gaming device.

FIG. 4 is a flow chart of a method 400 of retrofitting a gaming machine of an embodiment. In an example, the method involves connecting at step 410 the memory expansion board 250 of FIG. 2 to the memory expansion port 207 of the main board 201 of the gaming machine 104A, wherein the memory expansion board 250 comprises the programmable logic device 252 of FIG. 3 to execute a random number generator to generate a plurality of random numbers, and to write the random numbers into one or more registers of the memory expansion board 250 accessible by the main board 201, and at least one connector 281 (e.g., at least one of the connectors 281A, . . . , 281N of FIG. 3) for connecting the memory module 254 comprising game program code to the memory expansion board 250. In some examples, at least one memory module 254 comprising game program code is connected to the at least one connector 281.

The method 400 also involves at step 420 updating system software in the memory 208 of the main board 201 of FIG. 2 to include instructions, which, when executed by a processor 204 of the main board 201, cause the processor 204 to read random numbers from the one or more registers of the memory expansion board 250 when the processor 204 of FIG. 2 requires random numbers. The processor 204 also executes any game program code in the memory module 254 of FIG. 3 on the memory expansion board 250.

In another embodiment, instead of not using the RNG provided by the operating system code, the gaming machine 200 uses random numbers from the memory expansion board 250 to improve operation of the RNG provided by the operating system code.

In one example, the RNG provided by the operating system code incorporates the "Fortuna" algorithm. Fortuna is described in "Practical Cryptography" (Ferguson and Schneier, 2003) and provides a cryptographically secure pseudorandom number generator (CSPRNG). Other CSPRNGs may be used instead of Fortuna.

Fortuna can be implemented a number of ways. However, one implementation includes the use of an AES (Rijindael) 256-bit block cipher key and a 128-bit counter to run the cipher in counter mode as well as using SHA-256 for hashing and 32 pools of entropy.

In an example, each entropy pool is a SHA-256 hash of the entropy data. Entropy is added to one entropy one pool at a time and added to each entropy pool by cycling through all 32 pools.

Examples of entropy sources include unpredictable events within the gaming machine 200 such as interrupts from peripherals and messages placed in internal message port(s).

In an example, to form each item of entropy data every item of entropy has a time (counter) from a high precision timer appended to the data to prior to being hashed.

In an example, values from the RNG 259 of memory expansion board 250 are also used as an additional source of entropy. In an example, these values are used as an additional source of entropy during specific parts of the algorithm rather than as a constant source of entropy. For example, at boot-up of the gaming machine or during a reseed event. In one example, values from RNG are logically combined with seed values store for use by the RNG provided by the operating system code.

In further example embodiments, an additional hardware RNG (HWRNG) can be provided by an Inter-Integrated Circuit (I2C) device. For example, where there is a spare memory socket on the main board intended for EEPROMs. A device could be added to this spare socket that functions as a HWRNG.

In another example, where there is a serial peripheral interface (SPI) bus it could potentially be used to access a HWRNG.

In an example, the HWRNG could be a ring oscillator.

Figure 5:
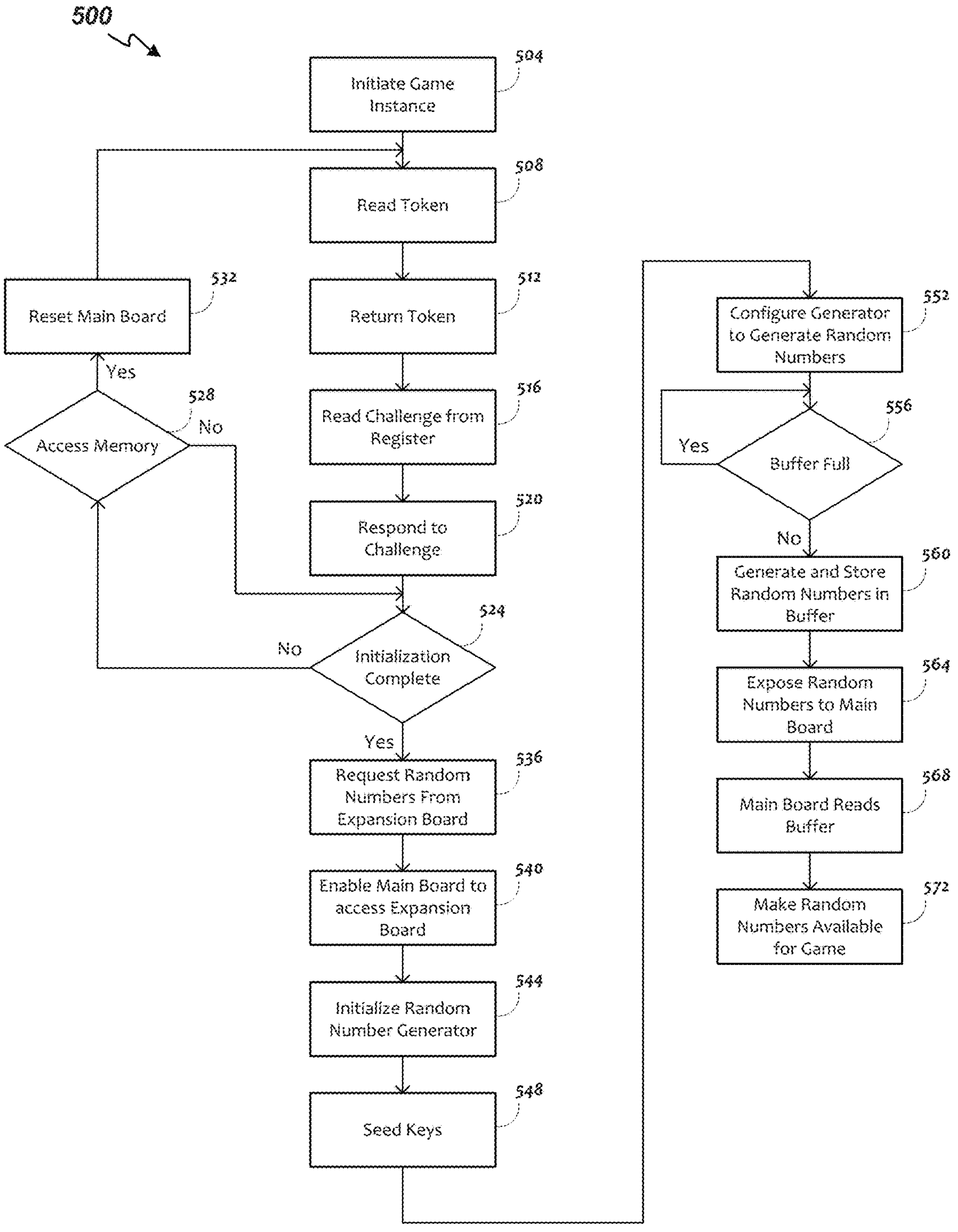
FIG. 5 illustrates a random number generating sequence.

FIG. 5 illustrates a random number generating sequence 500. At step 504, a game instance is initiated. The random number generating sequence 500 begins an initialization sequence starting with reading one or more expected tokens at step 508 from a designated register of the expansion board 250, and followed by step 512 in which the main board 201 sends a return token to the expansion board 250. At step 516, the main board 201 reads a challenge word from the expansion board 250. At step 520, the main board 201 responds to the expansion board 250 based on the challenge word read in step 516. The random number generating sequence 500, in the background, determines if the initialization sequence is complete at step 524 to signal the expansion board is ready to communicate with the main board 201. However, if main board 201 attempts to read from EPROM before the initialization sequence is complete, as determined at background step 528, the expansion board 250 resets the main board at step 532 and returns to determine if the initialization sequence is complete at step 524.

At step 536, if the initialization at step 524 is determined to be complete, the main board 201 or the game instance generates requests to receive random numbers from the expansion board 250. The expansion board 250 enables the main board 201 to access its buffers at step 540, and begins to initialize the random number generator 259 at step 544 and to seed cipher keys at step 548. At step 552, the random number generating sequence 500 configures the random number generator 259 to generate random numbers.

At step 556, the expansion board 250 determines if data buffers 256 are full. If the expansion board 250 determines that data buffers 256 are full, the random number generating sequence 500 repeatedly tests if the buffers remain to be full at step 556. However, if the expansion board 250 determines that data buffers 256 are not full, the random number generator 259 generates and stores random numbers in the buffers at step 560. At step 564, the expansion board 250 exposes the random numbers stored in the buffers to the main board 201. The main board 201 then reads the random numbers from the buffers at step 568, and makes the random numbers read available for use by the game instance at step 572.

EXAMPLE EMBODIMENTS

In an example embodiment, there is provided a gaming machine comprising: a main board comprising a processor, a memory storing system program code and an expansion port in data communication with a memory interface of the processor; a memory expansion board connected to the main board via the expansion port, the memory expansion board comprising a machine configured to execute a first random number generator and write random numbers into one or more registers of the memory expansion board accessible by the main board, wherein execution of the system code by the processor implements a second random number generator and causes the processor to read random numbers from the one or more registers of the memory expansion board as a source of entropy for the second random number generator.

In an example, the system code causes the processor to read random numbers from the one or more registers of the memory expansion board as a source of entropy each time the gaming machine is rebooted.

In an example, the system code causes the processor to read random numbers from the one or more registers of the memory expansion board as a source of entropy responsive to a reseed event.

In an example, the machine configured to execute the first random number generator is a programmable logic device.

In an example, the first random number generator is a true-random random number generator.

In an example, the memory expansion board comprises at least one memory module storing game program, and wherein when the processor executes said game program code, the game program code requests random numbers be provided by said system code.

In an example, said memory comprises game program code, and wherein when the processor executes said game program code, the game program code requests random numbers be provided by said system code.

In an example, each random number from the first random number generator comprises a first part and a second part and the first part and the second part are written into separate ones of two registers and the system code causes the processor to read the two registers to obtain the random number.

In an example, prior to reading the random number from the first random number generator, the processor polls a register of the memory expansion board to confirm that there is a random number available.

In an example, the first random number generator executed by the programmable logic device is configured to write generated random numbers to a first FIFO configured to hold a plurality of random numbers.

In an example, the programmable logic device comprises a second FIFO and the programmable logic device is configured to read random numbers from the first FIFO into the second FIFO.

In an example, the one or more registers are registers of the second FIFO.

Another example embodiment provides a method of operating a gaming machine comprising a main board comprising a processor and an expansion port in data communication with a memory interface of the processor, and a memory expansion board connected to the main board via the expansion port, the memory expansion board comprising a device configured to execute a first random number generator and write random numbers into one or more registers, the method comprising: implementing a second random number generator with the processor; and reading, by the processor, random numbers from the one or more registers of the memory expansion board as a source of entropy for the second random number generator.

In another example embodiment, there is provided a gaming machine comprising: a main board comprising a processor, a memory storing system program code and an expansion port in data communication with a memory interface of the processor; and a hardware random number generator connected to the main board and configured to generate first random numbers, wherein the processor executes game program code in order to generate game outcomes of a game playable with the gaming machine and the executing game code requests second random numbers from system code executed by the processor in order to generate the game outcomes, and wherein the system code executed by the processor implements a second random number generator in order to provide said second random numbers and causes the processor to obtain first random numbers from the hardware random number generator as a source of entropy for the second random number generator.

In another example embodiment, there is provided a method of operating a gaming machine comprising a main board comprising a processor, a memory storing system program code and an expansion port in data communication with a memory interface of the processor; and a hardware random number generator connected to the main board, the method comprising: generating first random numbers with the hardware random generator; executing system code by the processor in order to implement a second random number generator that outputs second random numbers including by obtaining first random numbers from the hardware random number generator as a source of entropy for the second random number generator; and using said second random numbers to generate game outcomes of a game playable with the gaming machine.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming machine comprising:

a main board comprising a processor and a memory storing a plurality of system codes, the system codes including a first random number generator, which, when executed, causes the processor to generate a first random number, and an expansion port; and an expansion board connectable to the main board at the expansion port, and, comprising:

a plurality of registers operable to store data accessible by the main board when the expansion board is connected to the expansion port, and a hardware device having a second random number generator operable to generate a second random number, and to write the second random number generated into the registers, and wherein, the system codes, when executed, further causes the processor to read the second random number stored in the registers as a source of entropy for the first random number generator.

2. The gaming machine of claim 1, wherein the hardware device comprises a programmable logic device.

3. The gaming machine of claim 1, wherein the memory comprises a plurality of game codes, and the game codes, when executed, causes the processor to request random numbers provided by the system codes.

4. The gaming machine of claim 1, wherein the second random number comprises a first part written into a first register, and a second part written into a second register, and the system codes, when executed, further cause the processor to access the first register and the second register to read the second random number.

5. The gaming machine of claim 1, wherein the expansion board further comprises a second processor operable to seed a plurality of keys, and the second random number generator is operable to produce the second random number with one or more of the keys.

6. The gaming machine of claim 1, wherein the second random number generator is operable to produce a plurality of random numbers at a rate in excess of a request rate required by the main board.

7. The gaming machine of claim 1, wherein the system codes further comprise an updating system software, which, when executed, further causes the processor to read the second random number from the expansion board instead of the first random number.

8. A method for generating a random number in a gaming system having a main board comprising a processor and a memory storing a plurality of system codes, the system codes including a first random number generator, and an expansion port, and an expansion board connectable to the main board at the expansion port, the expansion board including a plurality of registers operable to store data accessible by the main board when the expansion board is connected to the expansion port, and a hardware device, the method comprising:

- generating a second random number at the hardware device;
- storing the second random number generated in the registers;
- in response to determining the first random number generator is to generate a first random number, accessing the second random number stored in the registers as a source of entropy for the first random number generator; and
- generating the first random number based on the second random number.

9. The method of claim 8, wherein the hardware device comprises a programmable logic device.

10. The method of claim 8, wherein the memory comprises a plurality of game codes, further comprising the game codes, when executed, requesting one or more random numbers provided by the system codes.

11. The method of claim 8, wherein the second random number comprises a first part written into a first register, and a second part written into a second register, and the system codes, further comprising accessing the first register and the second register to read the second random number.

12. The method of claim 8, further comprising producing a plurality of random numbers at a rate in excess of a request rate required by the main board.

13. The method of claim 8, wherein the system codes further comprise an updating system software, further comprising reading the second random number from the expansion board instead of the first random number.

14. The method of claim 8, wherein the expansion board further comprises a second processor, further comprising the second processor seeding a plurality of keys, and producing via the second random number the second random number with one or more of the keys.

15. A non-transitory computer-readable medium comprising system codes for conducting a game on a gaming system having a main board comprising a processor, the system codes including a first random number generator, and an expansion board connectable to the main board, the expansion board including a plurality of registers operable to store data accessible by the main board when the expansion board is connected to the main board, and a hardware device, the system codes, which, when executed, cause the processor to perform the steps of:

- initiating the hardware device to generate a second random number;
- storing the second random number generated in the registers;
- when the system codes call for a first random number from the first random number generator, reading the second random number from the registers as a source of entropy for the first random number generator; and
- generating the first random number based on the second random number.

16. The non-transitory computer-readable medium of claim 15, wherein the hardware device comprises a programmable logic device.

17. The non-transitory computer-readable medium of claim 15, further comprising a plurality of game codes, wherein the game codes, when executed, further cause the processor to perform the step of requesting one or more random numbers provided by the system codes.

18. The non-transitory computer-readable medium of claim 15, wherein the second random number comprises a first part written into a first register, and a second part written into a second register, and wherein the system codes, when executed, further cause the processor to perform the step of accessing the first register and the second register to read the second random number.

19. The non-transitory computer-readable medium of claim 15, wherein the system codes, when executed, further cause the processor to perform the step of producing a plurality of random numbers at a rate in excess of a request rate required by the main board.

20. The non-transitory computer-readable medium of claim 15, wherein the expansion board further comprises a second processor, and wherein the system codes, when executed, further cause the processor to perform the step of the second processor seeding a plurality of keys, and producing via the second random number the second random number with one or more of the keys.

* * * * *